(12) United States Patent
Mollard et al.

(10) Patent No.: US 12,248,160 B2
(45) Date of Patent: Mar. 11, 2025

(54) OPTICAL SCANNER

(71) Applicant: COMMISSARIAT A L'ENERGIE ATOMIQUE ET AUX ENERGIES ALTERNATIVES, Paris (FR)

(72) Inventors: Laurent Mollard, Grenoble (FR); Christel Dieppedale, Grenoble (FR); Laurent Frey, Grenoble (FR); Olivier Girard, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 486 days.

(21) Appl. No.: 17/657,656

(22) Filed: Apr. 1, 2022

(65) Prior Publication Data

US 2022/0326419 A1    Oct. 13, 2022

(30) Foreign Application Priority Data

Apr. 12, 2021    (FR) ..................... 21 03742

(51) Int. Cl.
| | |
|---|---|
| G02B 26/08 | (2006.01) |
| G01S 7/481 | (2006.01) |
| G02B 5/08 | (2006.01) |
| G02B 5/09 | (2006.01) |
| G01S 17/02 | (2020.01) |

(52) U.S. Cl.
CPC ............ *G02B 5/09* (2013.01); *G01S 7/4817* (2013.01); *G02B 5/0808* (2013.01); *G02B 26/0833* (2013.01); *G01S 17/02* (2013.01)

(58) Field of Classification Search
CPC .... G02B 5/09; G02B 5/0808; G02B 26/0833; G02B 5/045; G02B 27/144; G01S 7/4817; G01S 17/02; G01S 17/42
See application file for complete search history.

(56) References Cited

U.S. PATENT DOCUMENTS

2019/0107622 A1    4/2019  Andersson
2020/0333547 A1*  10/2020  Mollard ............ G02B 26/0833

FOREIGN PATENT DOCUMENTS

| EP | 3 489 716 A1 | 5/2019 |
| FR | 3 055 702 A1 | 3/2018 |

OTHER PUBLICATIONS

French Preliminary Search Report Issued Dec. 21, 2021 in French Application 21 03742 filed on Apr. 12, 2021 (with English Translation of Categories of Cited Documents), 2 pages.

(Continued)

*Primary Examiner* — Euncha P Cherry
(74) *Attorney, Agent, or Firm* — Oblon, McClelland, Maier & Neustadt, L.L.P.

(57) ABSTRACT

An optical scanner (100) which comprises:
a mirror (200), pivotally mounted about a first pivot axis and is partially transparent from its front face (210) towards its rear face (220) to the light radiation;
a light source (300) intended to emit an incident light radiation on the front face (210) of the mirror (200);
the scanner is characterised in that the rear face (220) comprises a structuration formed by at least one facet essentially planar and inclined with respect to the front face (210) so that a light radiation, incident on the front face (210), and transmitted by the at least one facet (220i) undergoes a deflection with respect to the angle of incidence of said light radiation on the front face (210).

15 Claims, 7 Drawing Sheets

(56) References Cited

OTHER PUBLICATIONS

Holmström et al., "MEMS Laser Scanners: A Review", Journal of Microelectromechanical Systems, vol. 23, No. 2, Apr. 2014, 17 Pages.

* cited by examiner

OPTICAL SCANNER

TECHNICAL FIELD

The present invention relates to the field of optical and/or optoelectronic systems. More particularly, the invention relates to the field of imaging, for example of sceneries, or of detection.

More particularly, the invention relates to an optical scanner fitted with a mirror provided with a rear face structuration and intended to impart a deflection to a radiation transmitted by said rear face with respect to an incident radiation on the front face.

PRIOR ART

Micro-mirrors are nowadays widespread in the MEMS (Microelectromechanical systems) field and in particular in LIDAR-type ("Light Detection And Ranging systems") devices.

In particular, these allow sweeping a surface or a target with a light radiation for detection or imaging purposes.

In this respect, in these LIDAR-type devices, the micro-mirrors are arranged so as to oscillate about one or two pivot axes, at a predetermined sweep frequency, so as to reflect an incident radiation according to different directions.

The sweep frequency of the micro-mirrors could vary from a few Hz to several kHz and their size could be in the range from several tens of micrometres to several millimetres (for example a diameter of a few millimetres for disk-like shaped micro-mirrors), and could be comprised in particular between 500 µm and 10 mm.

FIG. 1 (extracted from the document [1] mentioned at the end of the description) illustrates a first possible architecture of a device provided with two micro-mirrors, respectively called first micro-mirror $1_1$ and second micro-mirror $2_1$, arranged so as to pivot about non-parallel first pivot axis $X_1X_1'$ and a second pivot axis $Y_1Y_1'$, respectively. In particular, these two micro-mirrors $1_1$ and $2_1$ are arranged so that a light beam emitted by a light source $3_1$ is reflected by the first micro-mirror $1_1$ in the direction of the second micro-mirror $2_1$ which, in turn, reflects it, for example, in the direction of a screen $4_1$. Thus, the rotation of each of the micro-mirrors $1_1$ and $2_1$ about their respective pivot axis allows performing a sweeping of a surface with the light beam, for example, for imaging or detection purposes.

However, such an architecture is not satisfactory.

Indeed, this architecture requires an accurate alignment of the two micro-mirrors, and is consequently difficult to make.

A second architecture, illustrated in FIG. 2 (extracted from the document [1] mentioned at the end of the description), may be considered. This last one implements a unique micro-mirror $1_2$ pivotally mounted about two non-parallel pivot axes $X_2X_2'$ and $Y_2Y_2'$. Thus, the oscillation of this micro-mirror $1_2$ about either one of the two pivot axes $X_2X_2'$ and $Y_2Y_2'$ allows sweeping the surface of a screen $4_2$ by means of a light beam originating from a light source $3_2$ and reflected by said micro-mirror $1_2$.

Nonetheless, this second architecture is neither satisfactory.

Although it is simpler to integrate, in some cases, this last one does not allow sweeping large surfaces with the light beam.

The present invention aims to provide a new reflector device and in particular a device that could sweep a larger surface than the devices known from the prior art.

DISCLOSURE OF THE INVENTION

Thus, the aim is reached by an optical scanner which comprises:
- a mirror, provided with a front face, essentially planar, and with a rear face, said mirror being pivotally mounted about a first pivot axis and is transparent or partially transparent to the light radiation from its front face up to its rear face or between its front face up to its rear face;
- a light source intended to emit an incident light radiation on the front face of the mirror, and the mirror being partially transparent from its front face towards its rear face to the light radiation;

the scanner is characterised in that the rear face comprises a structuration formed by at least one facet essentially planar and inclined with respect to the front face so that a light radiation, incident on the mirror on the front face side, and transmitted by the at least one facet undergoes a deflection with respect to the angle of incidence of said light radiation on the front face.

According to a particular embodiment, the first pivot axis extends in a first direction parallel to a main plane of the front face.

According to one embodiment, said scanner further comprises a first actuator intended to impart a rotation of the mirror about the first pivot axis.

According to one embodiment, the mirror is also pivotally mounted about a second pivot axis perpendicular to the first pivot axis, the second axis extending in a second direction parallel to said main plane of the front face.

According to one embodiment, said scanner further comprises a second actuator intended to impart a rotation of the mirror about the second pivot axis.

According to one embodiment, the rear face has a concave shape.

According to one embodiment, the at least one facet comprises a plurality of facets arranged according to a row.

According to one embodiment, the facets are arranged so as to form a sawteeth-like periodic profile, advantageously the periodicity of the sawteeth-like periodic profile is comprised between 50 µm and 100 µm, and with a teeth depth comprised between 5 µm and 10 µm.

According to one embodiment, the front face is partially reflective so that the light radiation that could be emitted by the light source is partly reflected by said front face and partly transmitted by the rear face.

According to one embodiment, the front face is covered by a partially reflective layer which comprises a Bragg stack, the Bragg stack comprising at least one elementary Bragg stack.

According to one embodiment, an elementary Bragg stack comprises a stack of two dielectric and/or semiconductor layers with different indices, advantageously an elementary Bragg stack comprises an amorphous silicon layer and a silicon oxide layer. According to one embodiment, the Bragg stack is limited to one or two elementary Bragg stack(s).

According to one embodiment, the transparent or partially transparent area comprises a support substrate forming said rear face, and wherein the front face is formed by an aperture reflective layer fitted with at least one opening revealing the support substrate or is formed by a reflective layer resting on a portion of an upper face of the support substrate.

According to one embodiment, the mirror comprises silicon.

According to one embodiment, the light radiation that could be emitted by the light source has a wavelength equal to 1,550 nm.

BRIEF DESCRIPTION OF THE DRAWINGS

Other features and advantages will appear in the following description of an optical scanner according to the invention, provided as non-limiting examples, with reference to the appended drawings wherein.

DETAILED DISCLOSURE OF PARTICULAR EMBODIMENTS

The present invention relates to an optical scanner provided with a mirror which has an essentially planar front face, this front face thus extends according to a given plane P called "main plane" and a structured rear face (opposite to the front face). In particular, the structuration of the rear face of the mirror is adapted so that a radiation crossing the mirror from the front face towards the rear face undergoes a deflection with respect to an angle of incidence of said radiation on the front face. In this respect, the structuration may comprise at least one facet essentially planar and inclined with respect to the front face and therefore to the main plane P. Thus, the rotation of the mirror allows performing an angular sweeping with the transmitted radiation.

Figure 1:
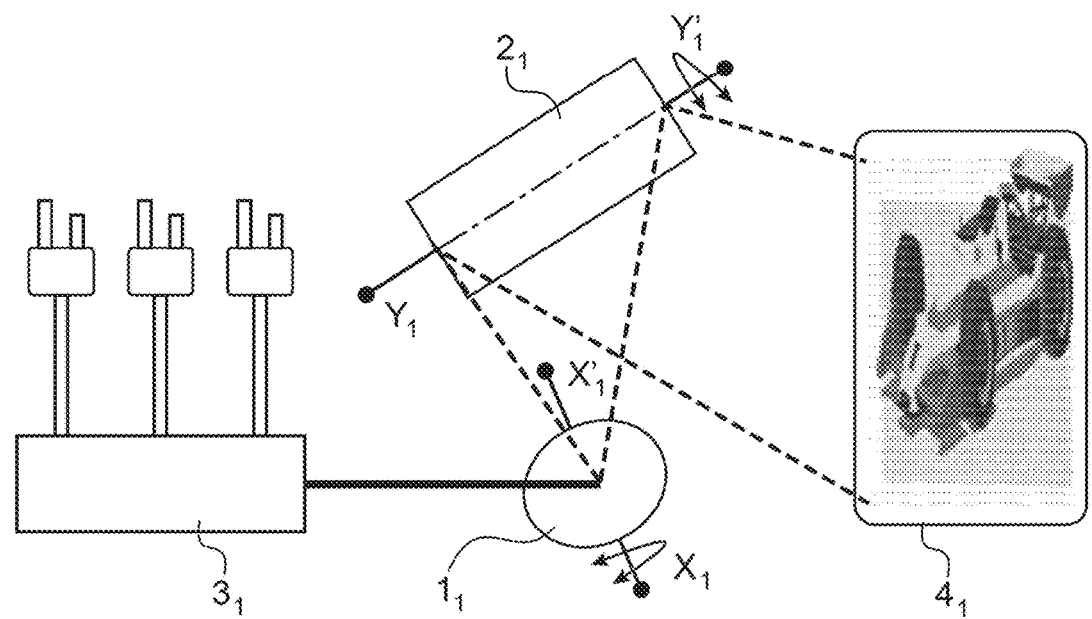
FIG. 1 illustrates a first architecture of a light sweeping device known from the prior art, and in particular from the document [1] mentioned at the end of the description, the device comprises in particular two micro-mirrors each pivotally mounted about different and non-parallel pivot axes.
Figure 2:
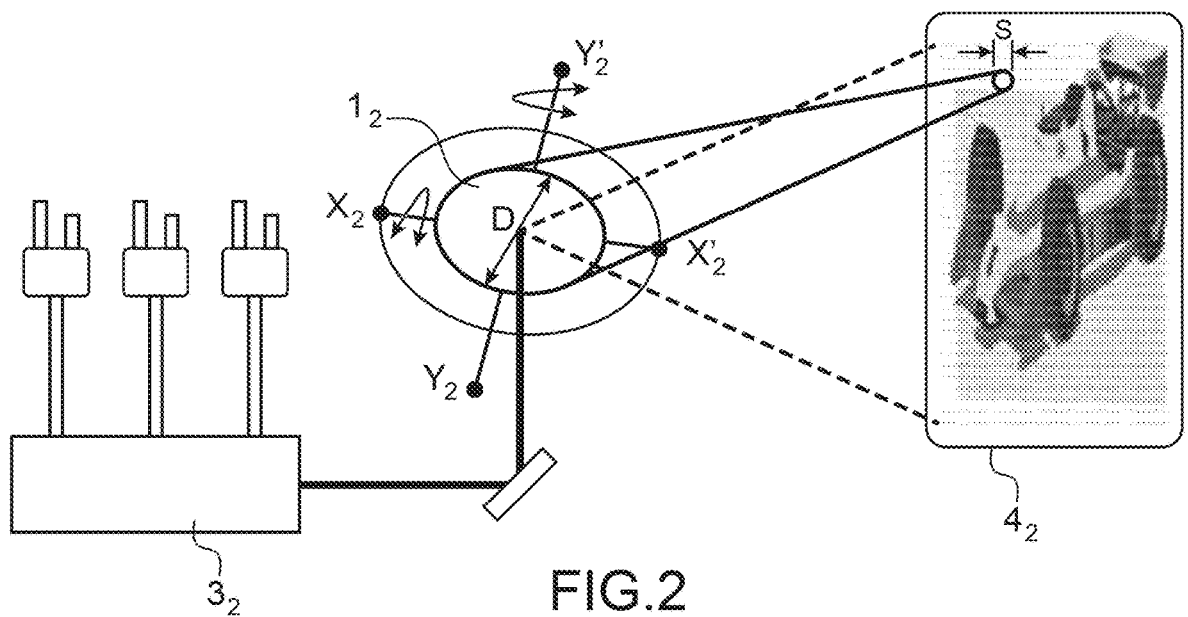
FIG. 2 illustrates a second architecture of a light sweeping device known from the prior art, and in particular from the document [1] mentioned at the end of the description, the device comprises in particular a micro-mirror pivotally mounted about two different and non-parallel pivot axes.
Figure 3A:
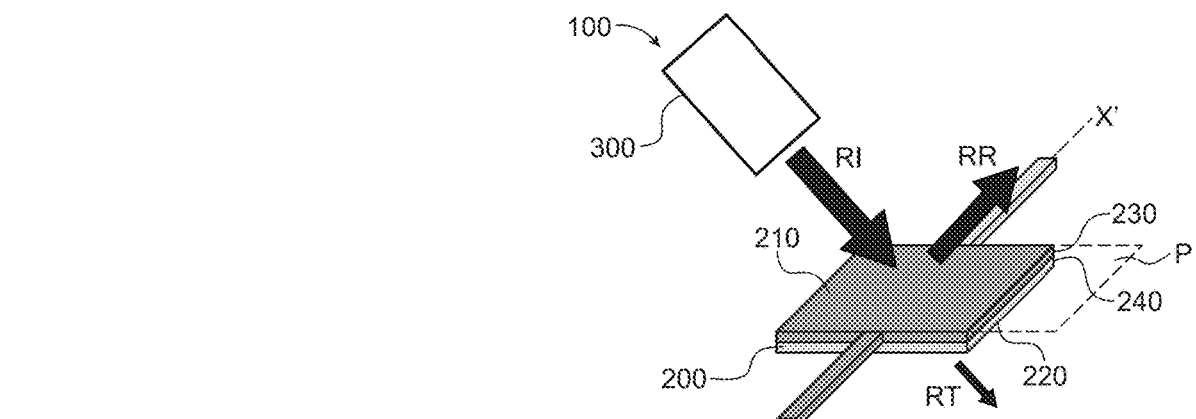
FIGS. 3A, 3B, 3C are schematic perspective representations of different embodiments of a mirror.

FIG. 3A is a schematic representation of an optical scanner 100 according to an embodiment of the present invention.

In particular, the optical scanner 100 comprises a mirror 200 pivotally mounted about a first pivot axis XX'.

In this respect, the mirror 200 comprises a front face 210, essentially planar, and a rear face 220 opposite to the front face 210.

The optical scanner 100 further comprises a light source 300 intended to emit an incident light radiation on the front face 210 of the mirror 200. Advantageously, the light source 300 may be a monochromatic source, for example a laser source or a light-emitting diode. For example, the wavelength of the radiation emitted by the light source may be equal to 1,550 nm.

In this example, the mirror 200 is partially transparent to the light radiation emitted by the light source 300. In other words, an incident light radiation (called incident radiation, and denoted "RI"), according to an angle of incidence θi, on the front face 210 of the mirror 200 crosses the latter from the front face 210 and comes therefrom, in the form of a transmitted radiation (denoted "RT"), by the rear face 220.

Moreover, the front face 210 may be partially reflective so that the reflection of the incident radiation also produces a reflected radiation RR (FIG. 3A).

In this respect, the mirror 200 may comprise a partially reflective layer 230 resting on a main face of a support substrate 240. A face of the partially reflective layer 230 then forms the front face 210 of the mirror. More particularly, the mirror 200 may comprise from its front face 210 towards its rear face 220, the partially reflective layer 230 and a support substrate 240. Each of the partially reflective layer 230 and the support substrate 240 may have an absorption coefficient that is negligible, and even zero, in the wavelength range covered by the incident radiation.

According to an advantageous embodiment, the partially reflective layer 230 could, in turn, comprise a Bragg stack (or Bragg mirror) formed by at least one elementary Bragg stack. By "Bragg stack", it should be understood a periodic series of transparent, or partially transparent, layers and with different refractive indices. An elementary Bragg stack comprises a stack of two dielectric and/or semiconductor layers.

More particularly, the mirror 200 may be formed, from its front face 210 towards its rear face 220, by the partially reflective layer 230 and the support substrate 240, each of the partially reflective layer 230 and the support substrate 240 may have an absorption coefficient that is negligible, and even zero, in the wavelength range covered by the incident radiation. The device still functions even when a quite considerable portion of the light is absorbed in the substrate 240, for example about 50%. For a thinned substrate with a thickness from 50 μm to 100 μm, this corresponds to an extinction coefficient k=10^-3 or to an absorption coefficient in the range of 100 cm-1.

In particular, when the considered incident light radiation is in the infrared range, and more particularly has a wavelength equal to 1,550 nm, the elementary Bragg stack may comprise a silicon dioxide layer with a thickness of 268 nm (whose refractive index at 1,550 nm amounts to 1.45) covered by an amorphous silicon layer with a thickness of 113 nm (whose refractive index at 1,550 nm amounts to 3.42). According to this configuration a Bragg stack comprising a unique elementary Bragg stack has, for an incidence comprised between 0° and 20°, a reflection coefficient equal to 88.8% and a transmission coefficient equal to 11% for a main light beam with a wavelength equal to 1,550 nm. Moreover, this stack is barely absorbing, and even not at all, and will consequently have an almost zero heat-up.

The limitation of the number of elementary Bragg stacks allows reducing the mechanical stresses imparted to the mirror, and thus prevent any deformation (for example incurvation) of said mirror.

Moreover, the sizing of the elementary Bragg stack allows adjusting the reflectivity in the wavelength range covered by the incident light radiation.

According to one variant, the mirror 200 may comprise an apertured reflective layer 250 resting on a portion of an upper face of the support substrate 240 made of a material transparent to the incident wavelength. Thus, the reflective layer 250 includes one or more openings revealing the support substrate 240 which absorption coefficient is negligible, in the wavelength range covered by the incident radiation.

Figure 3B:
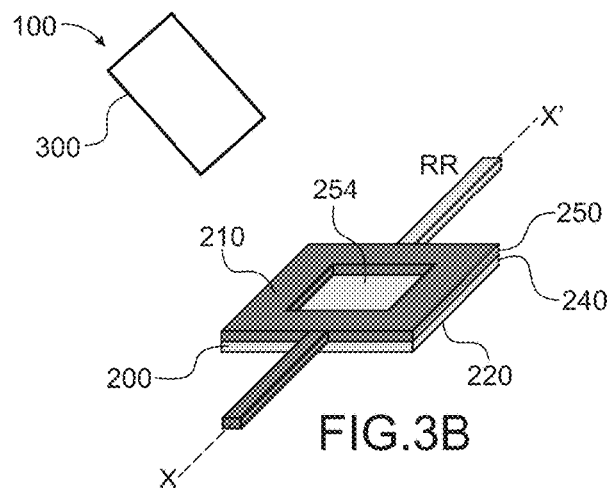

In the embodiment illustrated in FIG. 3B, a central opening 254 crosses the reflective layer 250 and extends up to the upper face of the support substrate 240. According to one variant (not represented), several openings cross the reflective layer 250 and reveal the support substrate 240.

The reflective layer 250 may be made of a metallic material such as gold or aluminium. According to a variant illustrated in FIG. 3C, the mirror 200 comprises a reflective layer 250 resting on only one portion of the upper face of the support substrate 240 made of a material transparent to the incident wavelength (FIG. 3C).

In turn, the support substrate 240 may comprise a semiconductor material and more particularly silicon.

Figure 3C:
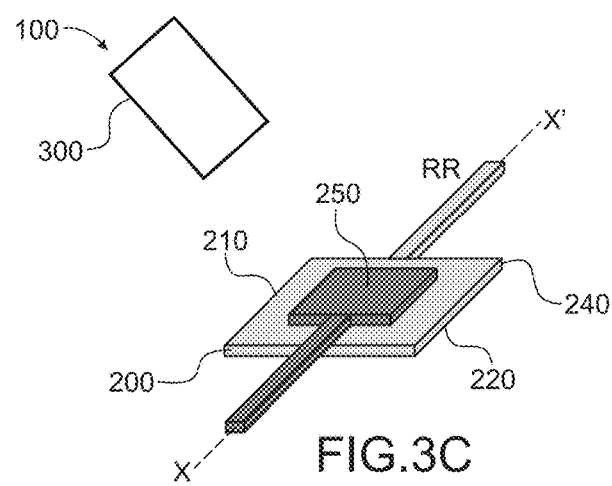

In either one of the examples of FIGS. 3B, 3C, the front face 210 of the mirror 200 is formed by the reflective layer 250.

In either one of the previously-described examples, the rear face 220 of the mirror may be formed by the lower face of the support substrate 240 opposite to said upper face of the latter.

Figure 4:
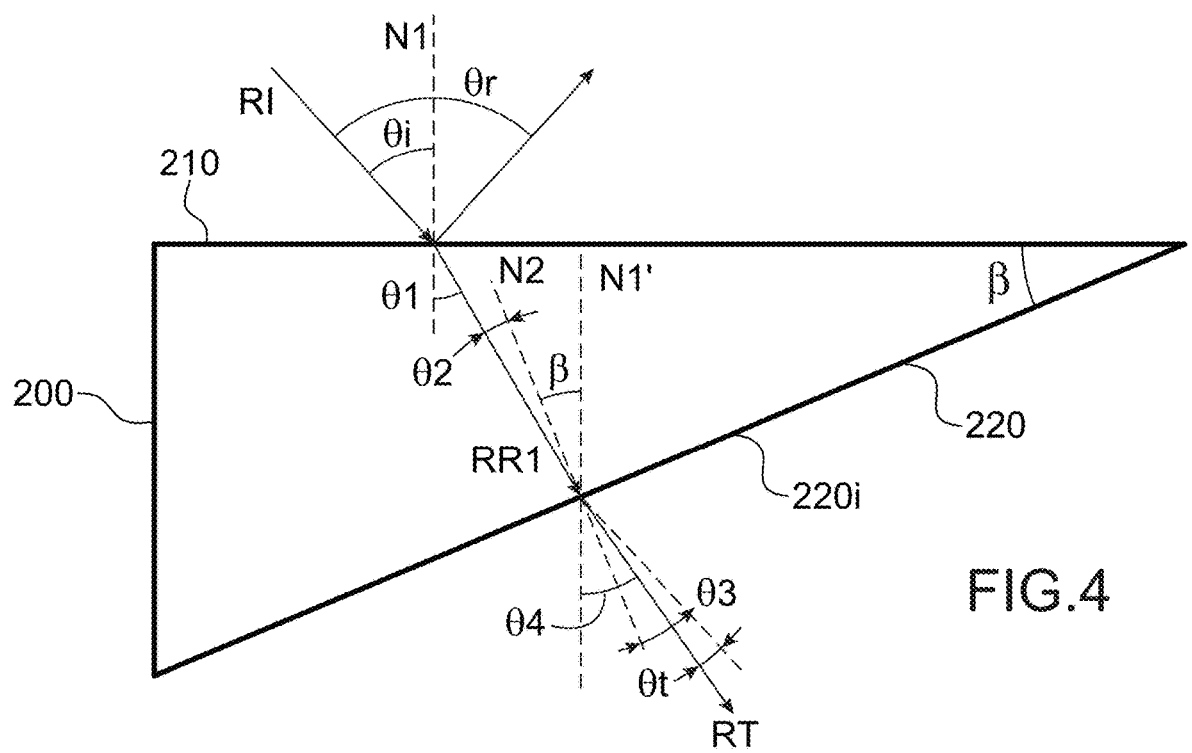
FIG. 4 is a schematic representation according to a sectional plane perpendicular to the front face and to the first pivot axis of a mirror that could be implemented in the context of the present invention.

In either one of the previously-described examples, the mirror 200 is fitted with at least one area transparent or partially transparent to the light radiation arranged between the front face and the rear face of the mirror. In the embodiment of FIG. 3A, this transparent or partially transparent area is formed by the layer 230 and the substrate 240 and extends from the front face 210 up to the rear face 230 of the mirror. Alternatively, the transparent or partially transparent area may extend from a region located between the front face and the rear face, up to the rear face. In the particular embodiment of FIGS. 3B and 3C, this area is thus formed by the substrate 240. Moreover, the rear face 220 is structured so as to impart a deflection of a transmitted radiation RT with respect to the incident radiation RI. As illustrated in FIG. 4, the structuration may comprise at least one facet 220i essentially planar and inclined by an angle β with respect to the front face 210.

Thus, according to this configuration, the incident radiation RI, incident on the front face 210 according to an angle of incidence θi with respect to the normal N1 of the front face 200, undergoes a first refraction when it crosses the front face 210 so as to form a refracted radiation RR1. The refracted radiation RR1 then forms an angle of refraction θ1 with respect to the normal N1 which meets the following relationship (1):

$$\sin(\theta i) = n \sin(\theta 1) \quad (1)$$

n being the refractive index of the mirror.

This same refracted radiation RR1 forms an angle θ2 with respect to the normal N2 of the rear face 220, and an angle θ2+β with the direction N1' parallel to the normal N1. Consequently, the angle θ2 meets the following relationship (2):

$$\theta 2 = \theta 1 - \beta \quad (2)$$

In turn, the refracted radiation RR1 is refracted by the rear face 220 so as to form the transmitted radiation RT. This transmitted radiation RT forms an angle θ3 with the normal N2, and an angle θ4 with the direction N1'. Moreover, the angle formed between the transmitted radiation RT and the incident radiation RI is denoted θt.

Thus, Snell-Descartes relationship allows writing:

$$\sin(\theta 3) = n \sin(\theta 2) \quad (3)$$

Moreover, the angles θ4 and θt meet the following relationships:

$$\theta 4 = \theta 3 + \beta \quad (4)$$

And $$\theta t = -(\theta 1 - \theta 4) \quad (5)$$

Thus, given the relationships (1) to (5), we could deduce a relationship between θt and θi:

$$\theta t = -\theta i + \left(\beta + \sin^{-1}\left(n\sin\left(-\beta + \sin^{-1}\left(\frac{\sin(\theta i)}{n}\right)\right)\right)\right) \rightarrow \quad (6)$$

Thus, the implementation of a facet 220i inclined by an angle β with respect to the front face 210 thus allows imparting a deflection of the transmitted radiation RT with respect to the incident radiation. In particular, this deflection varies as a function of the angle of incidence θi of the incident radiation RI.

Figure 5:
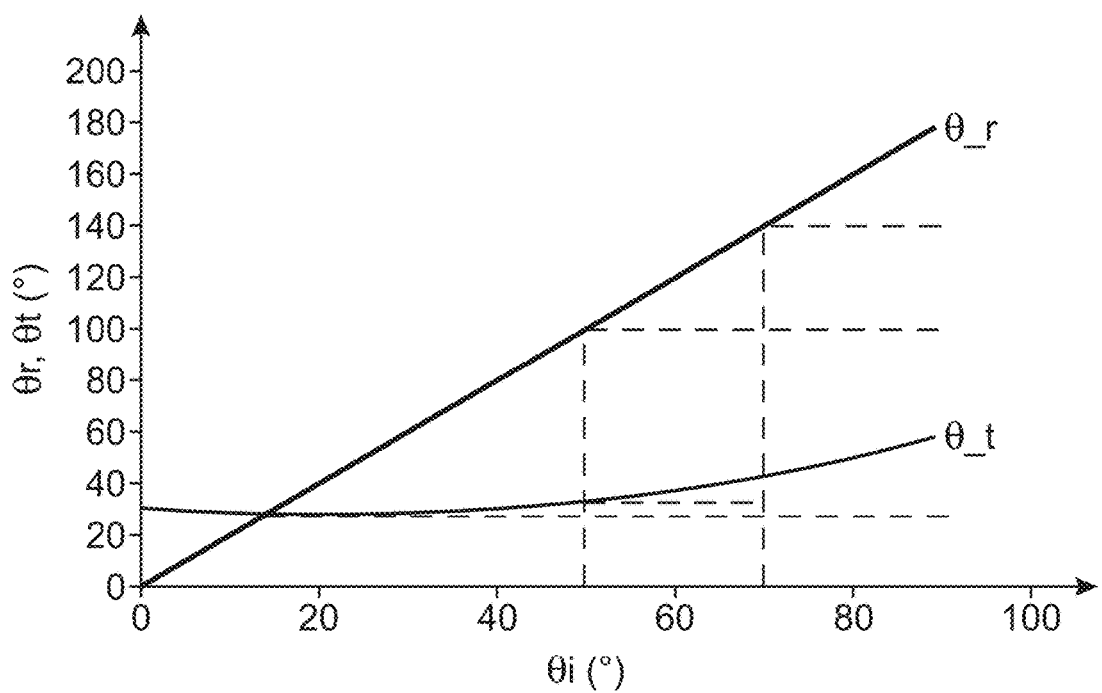
FIG. 5 is a graphical representation of the variation of the angles θt and θr (vertical axis) as a function of the angle of incidence θi (horizontal axis) that could be obtained with a mirror made of silicon (with a refractive index n equal to 3.48 at the wavelength 1.55 μm) and with an angle β=11°.
Figure 6:
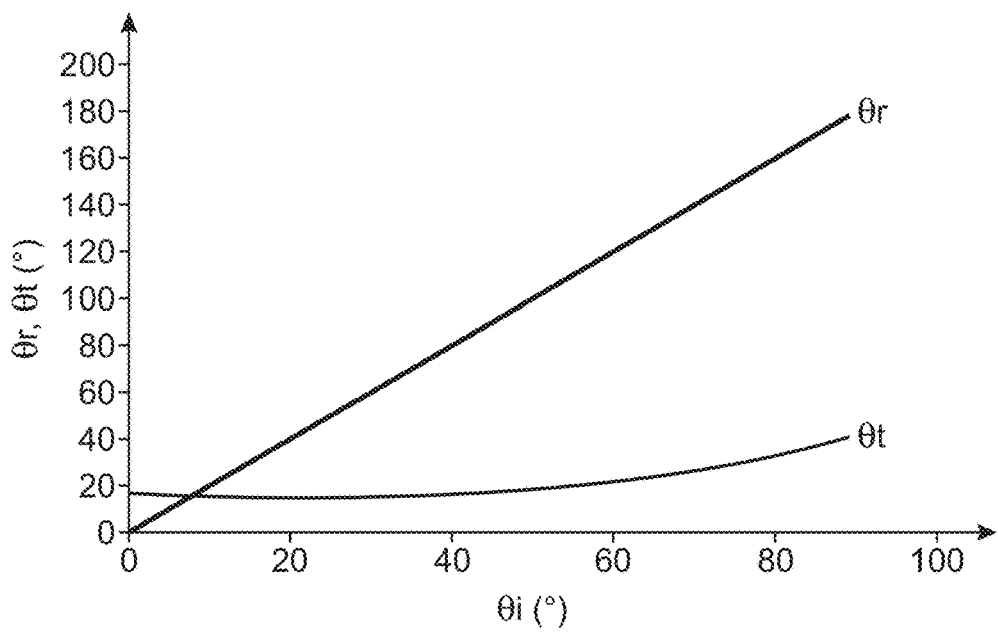
FIG. 6 is a graphical representation of the variation of the angles θt and θr (vertical axis) as a function of the angle of incidence θi (horizontal axis) that could be obtained with a mirror made of glass (with a refractive index n equal to 1.55 at the wavelength 1.55 μm) and with an angle β=26°.

In this respect, FIGS. 5 and 6 are graphical representations of the angles θt and θr as a function of the angle of incidence θi.

In particular, FIG. 5 represents the variation of the angles θt and θr as a function of the angle of incidence θi of a mirror 200 made of silicon (with a refractive index n equal to 3.48 at the wavelength 1.55 μm) and with an angle β=11°. According to this graphical representation, when the angle of incidence θi varies between 50° and 70°, the deflection θt of the transmitted radiation RT varies by 10°, whereas the angle θr varies by 40°.

Likewise, FIG. 6 represents the variation of the angles θt and θr as a function of the angle of incidence θi of a mirror 200 made of glass (with a refractive index n equal to 1.55 at the wavelength 1.55 μm) and with an angle β=26°. According to this graphical representation, when the angle of incidence θi varies between 50° and 70°, the deflection θt of the transmitted radiation RT varies by 10°, whereas the angle θr varies by 40°.

Thus, the rotation of the mirror 200 about the first pivot axis XX' enables the reflected RR and transmitted RT radiations to angularly sweep two distinct areas, which could possibly overlap.

According to an advantageous aspect (FIG. 7), the mirror 200 could also be pivotally mounted about a second pivot axis YY' perpendicular to the first pivot axis XX' and parallel to a second direction of the plane formed by the front face 210. According to this aspect, each of the reflected RR and transmitted RT radiations could sweep a surface by rotation of the mirror about either one of the first and second pivot axes.

For the rotation about the axis XX', the reflected and transmitted beams sweep the plane YZ, whereas for the rotation about the axis YY', the reflected beam sweeps a plane XRR0, the transmitted beam sweeps a plane XRT0, RR0 and RT0 being directions of the reflected RR and transmitted RT beams when the angle of rotation about the axis YY' is zero, i.e. when the incident ray is in the plane OYZ. Consequently, if a screen is initially positioned perpendicularly to each of the reflected RR and transmitted RT beams, the rotations about the axes XX' and YY' make the points of impact of these two beams describe a cross on the two screens.

Figure 7:
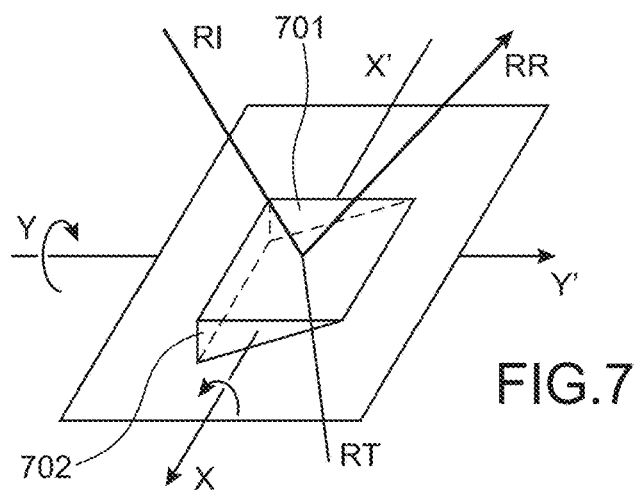
FIG. 7 is a schematic perspective representation of a mirror pivotally mounted about a first pivot axis and a second pivot axis.

In the particular embodiment illustrated in FIG. 7, the prism has a cylinder-like shape, in particular a straight cylinder with faces 701, 702 which are parallel to one another. Alternatively, a prism fitted with non-parallel faces 701, 702 could be provided.

In a particularly advantageous manner, the optical scanner 100 may comprise first and/or second actuators intended to control the rotation of the mirror 200 about the first pivot axis XX' and the second pivot axis YY', respectively. The first and second actuators may comprise at least one of the elements selected from among: an electrostatic actuator, a magnetic actuator, a piezoelectric actuator, a thermal actuator.

Alternatively to either one of the described examples, it is possible to provide for making the mirror(s) pivot about a number of pivot axes greater than two. Alternatively to either one of the described examples, it is also possible to provide for a pivoting of the mirror(s) according to one or more axes forming a non-zero angle with a parallel to the main plane of the mirror and to its front face, in other words according to one or more axes non-parallel to the front face of the mirror.

Figure 8:
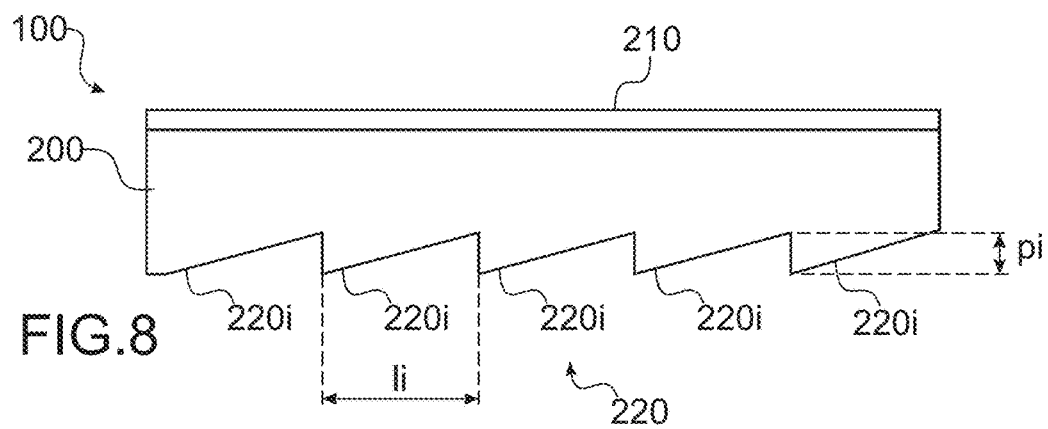
FIG. 8 is a schematic representation according to a sectional plane perpendicular to the front face and to the first pivot axis of a mirror provided with a plurality of facets and which could be implemented in the context of the present invention.
Figure 11:
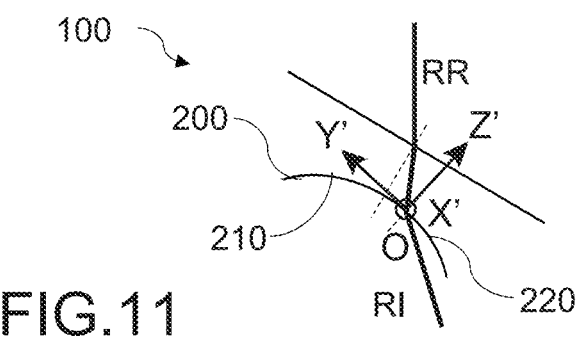
FIG. 11 is a schematic representation of a concave shaped mirror that could be implemented in the context of the present invention.

According to another aspect illustrated in FIG. 8, the structuration of the rear face 220 comprises a plurality of facets 220i arranged according to a row. In particular, the facets 220i may be arranged so as to form a sawteeth-like periodic profile. Advantageously, the interval Ii between two teeth of the sawteeth-like profile is comprised between 50 µm and 100 µm, and the depth pi of the teeth comprised between 5 µm and 10 µm. Complementarily (FIG. 11), the rear face 220 may have a concave shape which thus allows increasing the sweep angle θt.

Thus, the angle between the input and output faces varies according to the position on the axis OY' of the orthogonal reference frame [O; X'; Y'; Z'] given in FIG. 11. When the angle of incidence of the beam on the input face is small for example less than 10° and the point of impact of the beam on the input face is close to the point where the two faces are parallel, the deviation of the transmitted beam is very small, and possibly zero if the angle of incidence is zero and the beam falls on the top of the concave shape. When the mirror is rotated about the axis OX', the angle of incidence of the beam on the front face increases and the beam transmitted by the front face reaches the rear face at a position which goes away from the point where the two faces are parallel. Thus, the angle of incidence on the rear face increases and the deviation increases. This allows widening the swept angular range in transmission.

The invention also relates to a method for manufacturing the optical scanner and more particularly the mirror 200.

Figure 9A:
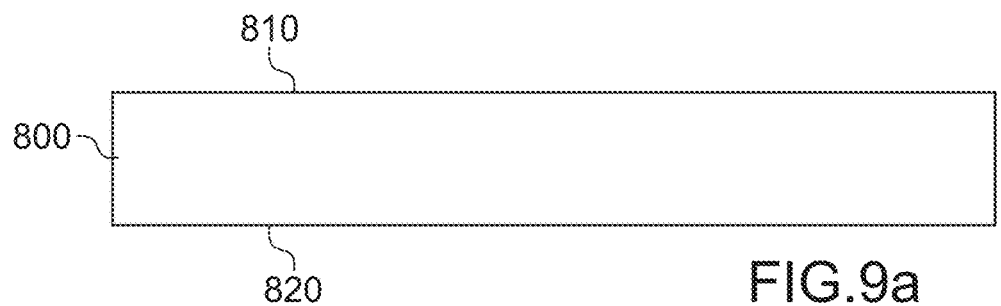
FIGS. 9a, 9b, 9c, 9d, 9e, 9f, 9g are schematic representations illustrating a second method for manufacturing a mirror that could be implemented in the context of the present invention.

The method comprises the supply of a substrate 800 provided with a front face 810 and with a rear face 820 (FIG. 9a).

Figure 10A:
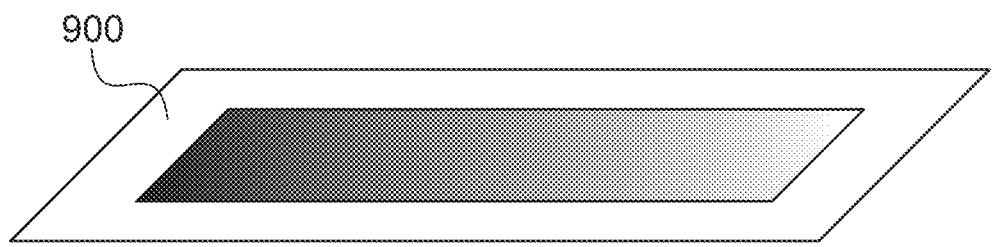
FIGS. 10a, 10b, 10c are schematic representations illustrating the formation of the structuration in the context of the second manufacturing method.

Afterwards, a structuration in the form of a triangular or sawteeth-like signal is formed starting from the front face 810. The formation of this structuration may involve the implementation of a grayscale mask 900 (FIG. 10a).

Figure 10B:
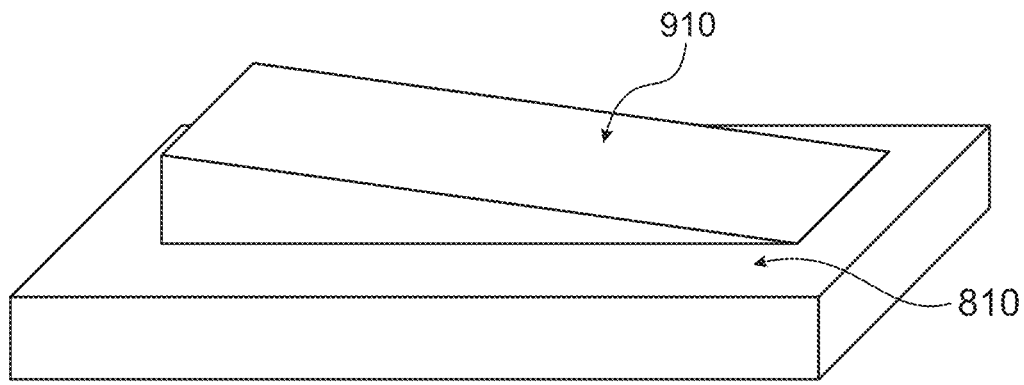
Figure 10C:
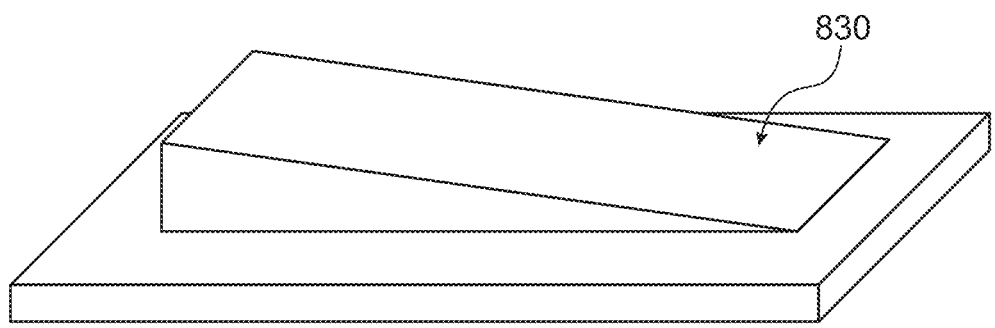

The insolation of a resin layer 910 with such a mask, followed by the development thereof confers a triangular profile on said resin (FIG. 10b).

The triangular profile 830 of the front face 810 results from a dry etching followed by a step of annealing the resin. The triangular profile may have a period I comprised between 50 µm and 100 µm, and a depth p comprised between 5 µm and 10 µm.

Figure 9B:
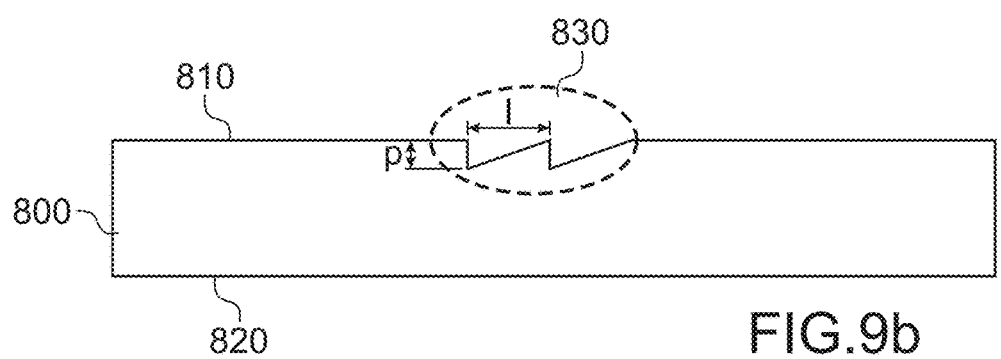
Figure 9C:
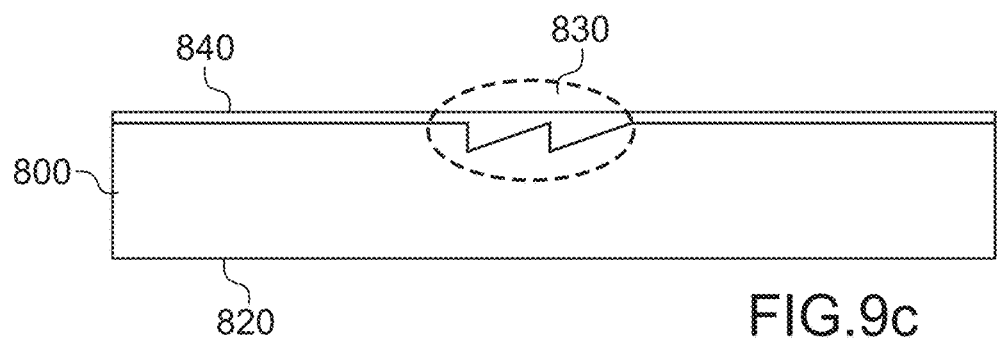

The formation of the structuration is followed by a step of forming a $SiO_2$ layer by PECVD and by a planarisation of said layer 840 (FIGS. 9b and 9c). In particular, upon completion of the planarisation, this layer has a thickness larger than the depth p.

Figure 9D:
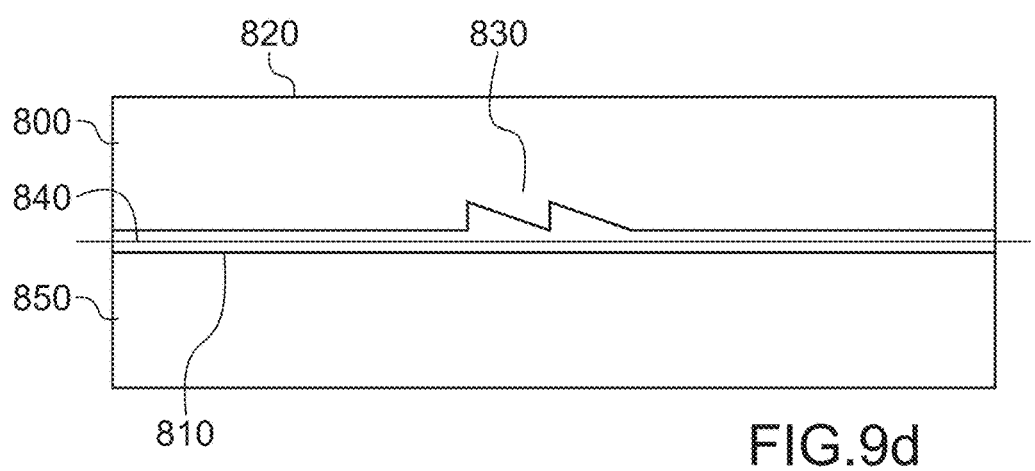

Afterwards, the substrate 800 is assembled with a receiver substrate 850 by contacting the $SiO_2$ layer 840 with a main face of the receiver substrate 850 (FIG. 9d).

This assembly may comprise a molecular bonding followed by a heat treatment intended to reinforce the bonding interface.

The assembly is then followed by a step of thinning, in particular mechanical thinning, of the substrate 800 (FIG. 9d).

Figure 9E:
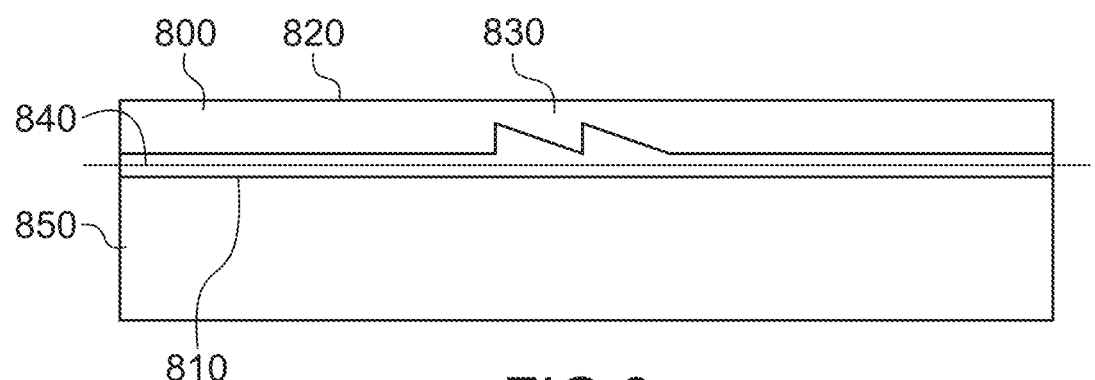

The second manufacturing method also comprises steps of forming electrodes 710 and wafers 700 delimiting in particular the mirror 200 (FIG. 9e).

Figure 9F:
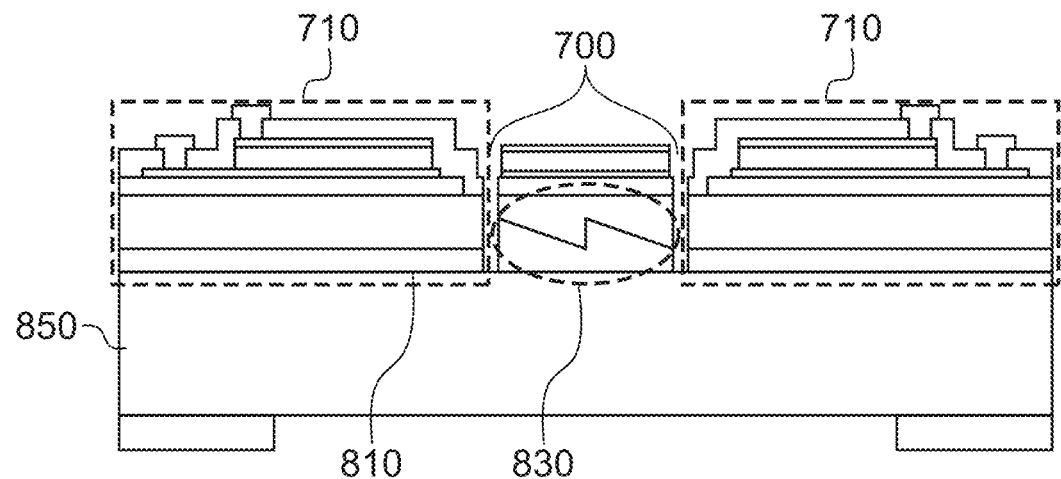
Figure 9G:
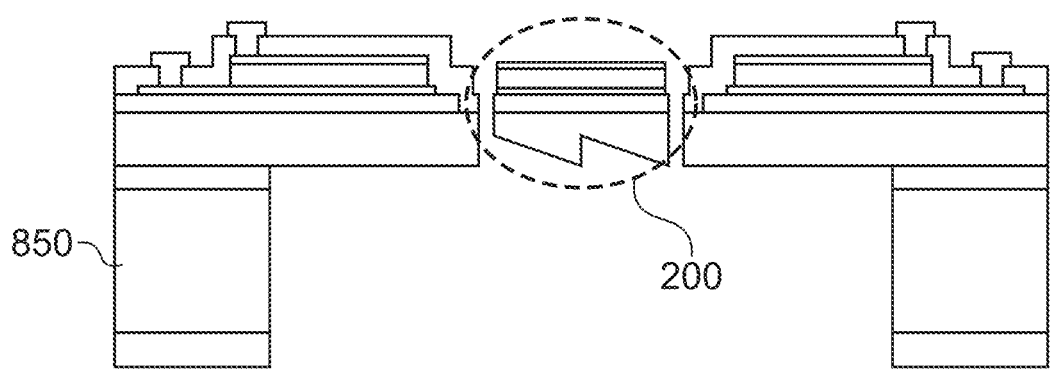

Finally, the second manufacturing method comprises a step of etching through an exposed main face of the receiver substrate 850 intended to clear the mirror 200 (FIG. 9f). This etching step may be carried out by DRIE (standing for "Deep Reactive Ion Etching") so as to preserve the rear face structuration of the mirror 200. The $SiO_2$ layer may also be removed off the mirror 200.

REFERENCES

[1] Sven Holmstrom et al., "MEMS laser scanners: a review", Journal of Microelectromechanical Systems April 2014, DOI: 10.1109/JMEMS.2013.2295470.

The invention claimed is:
1. An optical scanner (100) which comprises:
a mirror (200), provided with a front face (210), essentially planar, and with a rear face (220), said mirror (200) being pivotally mounted about a first pivot axis and being transparent or partially transparent in an area between said front face (210) and up to said rear face (220) or from said front face up to said rear face;
a light source (300) intended to emit an incident light radiation on the front face (210) of the mirror (200), and the mirror (200) being partially transparent from its front face (210) towards its rear face (220) to the light radiation;
the scanner is characterised in that the rear face (220) includes a structuration formed by at least one facet essentially planar and inclined with respect to the front face (210) so that a light radiation, incident on the mirror (200) on the front face (210) side, and transmitted by the at least one facet (220i) undergoes a deflection with respect to an angle of incidence of said light radiation on the front face (210).

2. The scanner according to claim 1, wherein the front face (210), essentially planar, extends according to a main plane, the first axis pivots according to a first direction parallel to said main plane.

3. The scanner according to claim 1, wherein said scanner further comprises a first actuator intended to impart a rotation of the mirror (200) about the first pivot axis.

4. The scanner according to claim 1, wherein the front face (210), essentially planar, extends according to a main plane and wherein the mirror (200) is also pivotally mounted about a second pivot axis perpendicular to the first pivot axis, the second axis pivots according to a second direction parallel to said main plane.

5. The scanner according to claim 4, wherein said scanner further comprises a second actuator intended to impart a rotation of the mirror (200) about the second pivot axis.

6. The scanner according to claim 1, wherein the rear face (220) has a concave shape.

7. The scanner according to claim 1, wherein the at least one facet comprises a plurality of facets arranged according to a row.

8. The scanner according to claim 7, wherein the facets are arranged so as to form a sawteeth-like periodic profile, advantageously the periodicity of the sawteeth-like periodic profile is comprised between 50 μm and 100 μm, and with a teeth depth comprised between 5 μm and 10 μm.

9. The scanner according to claim 1, wherein the front face (210) is partially reflective so that the light radiation that could be emitted by the light source (300) is partly reflected by said front face (210) and partly transmitted by the rear face (220).

10. The scanner according to claim 1, wherein the front face (210) is formed by a partially reflective layer (230) which comprises a Bragg stack, the Bragg stack comprising at least one elementary Bragg stack.

11. The scanner according to claim 10, wherein the elementary Bragg stack comprises a stack of two dielectric and/or semiconductor layers, advantageously the elementary Bragg stack comprises an amorphous silicon layer and a silicon oxide layer.

12. The scanner according to claim 10, wherein the Bragg stack is limited to one or two elementary Bragg stack(s).

13. The scanner according to claim 1, wherein the mirror comprises a support substrate (240) forming said rear face (220), and wherein the front face (210) is formed by an apertured reflective layer (250) fitted with at least one opening (254) revealing the support substrate (240) or is formed by a reflective layer (250) resting on a portion of an upper face of the support substrate.

14. The scanner according to claim 1, wherein the mirror (200) comprises silicon.

15. The scanner according to claim 1, wherein the light radiation that could be emitted by the light source (300) has a wavelength equal to 1,550 nm.

* * * * *